Figures 1, 2, 3:
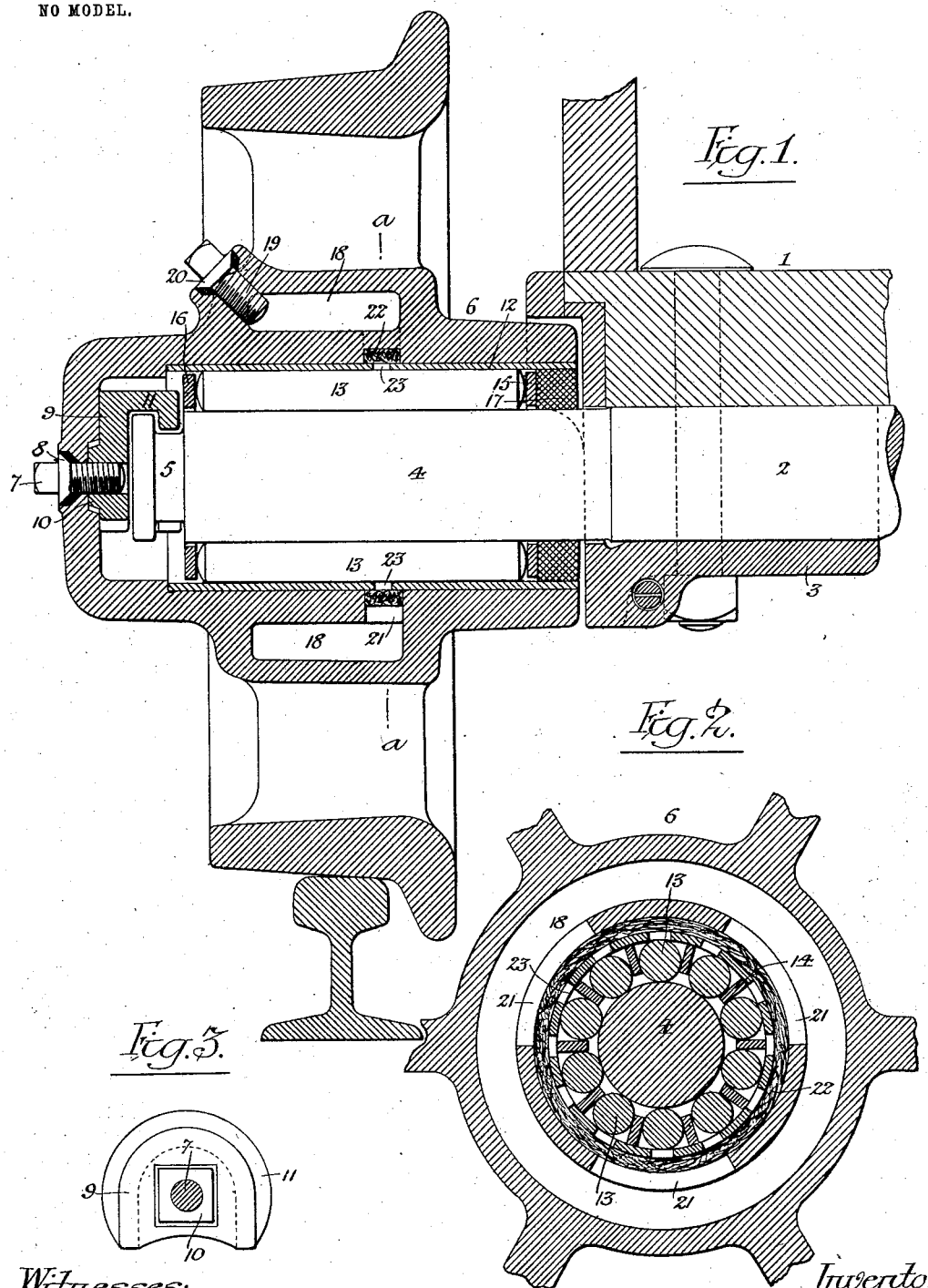

No. 729,446. PATENTED MAY 26, 1903.
J. STUART.
BEARING FOR CAR WHEELS.
APPLICATION FILED OCT. 25, 1902.
NO MODEL.

Witnesses:
Titus H. Irons.
Herman E. Mitius.

Inventor:
Joseph Stuart,
by his Attorneys,
Howson & Howson

No. 729,446. Patented May 26, 1903.

UNITED STATES PATENT OFFICE.

JOSEPH STUART, OF WILMINGTON, DELAWARE, ASSIGNOR TO LOBDELL CAR WHEEL COMPANY, OF WILMINGTON, DELAWARE, A CORPORATION OF DELAWARE.

BEARING FOR CAR-WHEELS.

SPECIFICATION forming part of Letters Patent No. 729,446, dated May 26, 1903.

Application filed October 25, 1902. Serial No. 128,787. (No model.)

*To all whom it may concern:*

Be it known that I, JOSEPH STUART, a citizen of the United States, and a resident of Wilmington, Delaware, have invented certain Improvements in Bearings for Car-Wheels, of which the following is a specification.

My invention relates to bearings for that class of wheels which turn on, but are longitudinally confined to, the journal, such wheels being used mainly in connection with mine-cars and for like uses.

The object of my invention is to provide the wheel with a roller-bearing and with a retaining device which serves not only to keep the wheel in place on the journal, but also to retain the roller-bearing in its proper position on the latter, the wheel being also provided with a lubricating-chamber in communication with the roller-bearing, whereby the latter will be maintained in a properly-lubricated condition for a long period of time.

In the accompanying drawings, Figure 1 is a longitudinal section of part of a car and journaled axle with wheel, roller-bearing, and wheel-retainer constructed in accordance with my invention. Fig. 2 is a transverse section on the line *a a*, Fig. 1; and Fig. 3 is an end view of the retainer detached from the wheel.

In Fig. 1 of the drawings, 1 represents part of the bottom of a mine-car or other structure, and 2 part of an axle, which is held in place on the bottom of the car by means of a clamp-box 3. The axle has a journal 4, with an annular recess 5 near the outer end of the same, and the wheel has a hub 6, open at the inner end, but closed at the outer end, with the exception of a central opening, which receives a bolt 7, having a suitably-packed flange or head 8, so as to prevent the entrance of dust into the hub at this point. The bolt 7 serves to secure in place against the inner face of the hub 6 a plate 9, which has a squared or other polygonally-formed boss 10, adapted to a correspondingly-shaped recess in the inner end of the hub, so that the plate is prevented from turning independently of the hub. Projecting inwardly from the plate 9 is a hooked segmental flange 11, which engages with the annular recess 5 near the end of the journal 4, and thus serves to prevent longitudinal displacement of the wheel on said journal. The hub 6 has an annular bushing 12, which runs upon rollers 13, interposed between said bushing and the journal 4, these rollers being separated from each other by the transverse bars 14 of a cage, which is also provided with inner and outer end rings 15 and 16, as shown in Fig. 1, this cage therefore turning around the journal with the rollers 13.

The inner end of the bushed hub of the wheel is filled with a mass of packing 17, which bears upon the journal 4 and prevents the entrance of dust or dirt into the hub of the wheel at that point and also serves to restrict inward movement of the roller-cage, outward movement of the latter being prevented by its contact with the hooked segmental flange 11 of the locking-plate 9, so that the rollers 13 are always maintained in their proper longitudinal position upon the journal 4.

The hub of the wheel contains an oil-chamber 18, the entrance to which is closed by a screw-plug 19, with packed head or flange 20, and this lubricating-chamber communicates through openings 21 with an annular chamber formed in the hub around the bushing 12, said chamber containing a ring 22 of felt or other absorbent material. The chamber communicates with the roller-bearing through openings 23 in the bushing 12. Hence the lubricant is permitted to pass from the chamber 18 of the hub through the felt or other ring 22, and is thereby delivered in limited quantity to the roller-bearing, so as to maintain the latter in a properly-lubricated condition until the supply in the chamber 18 has been exhausted.

Having thus described my invention, I claim and desire to secure by Letters Patent—

1. The combination of a wheel having a hub closed at the outer end, with a locking-plate secured to the inner face of said outer end of the hub and having at one side a hooked projection engaging a groove in the journal upon which the wheel turns, said projection extending beyond the journal and thereby serving to retain in position a bearing-cage, substantially as described.

2. The combination of a wheel having a hub closed at the outer end, with a plate secured to the inner face of said outer end of the hub, said plate having an outwardly-projecting boss and an inwardly-projecting hooked flange, the boss engaging a recess in the end of the hub to prevent turning of one independently of the other, and the hooked flange being adapted to engage a groove in the journal upon which the wheel turns, substantially as specified.

3. A wheel having a hub closed at the outer end, an internal locking-plate secured to said hub and having a flange for engaging a groove in the journal, said flange being constructed to limit the outward movement of a roller-bearing cage, substantially as described.

In testimony whereof I have signed my name to this specification in the presence of two subscribing witnesses.

JOSEPH STUART.

Witnesses:
CHARLES C. NORRIS, Jr.,
F. E. BECHTOLD.